United States Patent
Zhang et al.

(10) Patent No.: US 11,037,591 B2
(45) Date of Patent: Jun. 15, 2021

(54) HEAT-ASSISTED MAGNETIC RECORDING MEDIUM AND MAGNETIC STORAGE APPARATUS

(71) Applicant: SHOWA DENKO K.K., Tokyo (JP)

(72) Inventors: Lei Zhang, Chiba (JP); Chen Xu, Chiba (JP); Takayuki Fukushima, Chiba (JP); Kazuya Niwa, Chiba (JP); Tetsuya Kanbe, Chiba (JP); Hisato Shibata, Chiba (JP); Takehiro Yamaguchi, Chiba (JP); Tomoo Shige, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 278 days.

(21) Appl. No.: 16/433,377

(22) Filed: Jun. 6, 2019

(65) Prior Publication Data

US 2019/0392860 A1     Dec. 26, 2019

(30) Foreign Application Priority Data

Jun. 25, 2018   (JP) .............................. JP2018-120042

(51) Int. Cl.
  *G11B 5/73*   (2006.01)
  *G11B 5/65*   (2006.01)
  *G11B 5/00*   (2006.01)

(52) U.S. Cl.
  CPC .......... *G11B 5/7375* (2019.05); *G11B 5/7369* (2019.05); *G11B 5/65* (2013.01); *G11B 2005/0021* (2013.01)

(58) Field of Classification Search
  CPC ....... G11B 5/7375; G11B 5/7369; G11B 5/65; G11B 2005/0021; G11B 5/737
  See application file for complete search history.

(56) References Cited

U.S. PATENT DOCUMENTS

| 9,361,924 | B2* | 6/2016 | Niwa ..................... G11B 5/737 |
| 9,818,441 | B2 | 11/2017 | Kanbe et al. |
| 2011/0235479 | A1 | 9/2011 | Kanbe et al. |
| 2012/0207003 | A1 | 8/2012 | Kanbe et al. |
| 2014/0144775 | A1 | 5/2014 | Sano et al. |

FOREIGN PATENT DOCUMENTS

| CN | 102208192 | 10/2011 |
| CN | 102646421 | 8/2012 |
| CN | 103687977 | 3/2014 |
| JP | 2011-165232 | 8/2011 |

* cited by examiner

*Primary Examiner* — Holly Rickman
(74) *Attorney, Agent, or Firm* — IPUSA, PLLC

(57) ABSTRACT

A heat-assisted magnetic recording medium includes: a substrate; an underlayer; and a magnetic layer including an alloy having an $L1_0$ structure, wherein the underlayer includes, from the substrate side, a bcc underlayer including a substance having a bcc structure, a first oxide layer that is in contact with the bcc underlayer, and a second oxide layer that is in contact with the magnetic layer. The bcc underlayer, the first oxide layer, and the second oxide layer are stacked in the recited order. The first oxide layer and the second oxide layer include magnesium oxide, and the second oxide layer further includes one or more compounds selected from the group consisting of vanadium oxide, vanadium nitride, and vanadium carbide.

6 Claims, 2 Drawing Sheets

HEAT-ASSISTED MAGNETIC RECORDING MEDIUM AND MAGNETIC STORAGE APPARATUS

CROSS-REFERENCE TO RELATED APPLICATIONS

This application is based on and claims priority to Japanese Patent Application No. 2018-120042 filed on Jun. 25, 2018, the entire contents of which are incorporated herein by reference.

BACKGROUND OF THE INVENTION

1. Field of the Invention

The disclosures herein generally relate to a heat-assisted magnetic recording medium and a magnetic storage apparatus.

2. Description of the Related Art

A heat-assisted recording method, by which a surface is locally heated by irradiating a magnetic recording medium with near-field light or the like such that writing on the magnetic recording medium is performed by reducing the magnetic coercivity of the magnetic recording medium, is known as a next-generation recording method that can realize an areal recording density of approximately 1 Tbit/inch$^2$. Using the heat-assisted recording method, it is possible to easily write on a magnetic recording medium having a coercivity of several tens of kOe at ambient temperature by the recording magnetic field of a magnetic head. Therefore, a high Ku material whose crystal magnetic anisotropic constant Ku is on the order of $10^6$ J/m$^3$ can be used for a magnetic layer. As a result, while maintaining the thermal stability of the magnetic layer, the grain size of magnetic grains can be reduced to 6 nm or less. As high Ku materials, alloys such as FePt alloys (Ku≈$7 \times 10^6$ J/m$^3$) having an L1$_0$ structure and CoPt alloys (Ku≈$5 \times 10^6$ J/m$^3$) are known.

In order to enhance the areal recording density of a heat-assisted magnetic recording medium, it is necessary to enhance the electromagnetic conversion characteristics of the heat-assisted magnetic recording medium by enhancing the crystal orientation of the magnetic layer, making the magnetic grains finer, and reducing exchange coupling between the magnetic grains.

In a case where a FePt alloy having an L1$_0$ structure is used as the magnetic layer, the magnetic layer is required to be (001) oriented in order to enhance the crystal orientation of the magnetic layer. For this reason, for an underlayer, it is preferable to use (100) oriented MgO. Here, the (100) plane of MgO lattice-matches the (001) plane of a FePt alloy having an L1$_0$ structure.

Also, in order to make magnetic grains finer and reduce exchange coupling between the magnetic grains, it is described that an underlayer is formed that includes MgO as a main component and includes at least one kinds of oxide selected from SiO$_2$, TiO$_2$, Cr$_2$O$_3$, Al$_2$O$_3$, Ta$_2$O$_5$, ZrO$_2$, Y$_2$O$_3$, CeO$_2$, MnO, TiO, and ZnO (for example, see Patent Document 1).

RELATED-ART DOCUMENTS

Patent Documents

[Patent Document 1] Japanese Laid-Open Patent Publication No. 2011-165232

However, it is desired to further enhance the areal recording density of a heat-assisted magnetic recording medium. That is, it is desired to further enhance the electromagnetic conversion characteristics of the heat-assisted magnetic recording medium.

It is an object of one aspect of the present invention to provide a heat-assisted magnetic recording medium having excellent electromagnetic conversion characteristics.

SUMMARY OF THE INVENTION (1) A heat-assisted magnetic recording medium includes: a substrate; an underlayer; and a magnetic layer including an alloy having an L1$_0$ structure, wherein the underlayer includes, from the substrate side, a bcc underlayer including a substance having a bcc structure, a first oxide layer that is in contact with the bcc underlayer, and a second oxide layer that is in contact with the magnetic layer. The bcc underlayer, the first oxide layer, and the second oxide layer are stacked in the recited order. The first oxide layer and the second oxide layer include magnesium oxide, and the second oxide layer further includes one or more compounds selected from the group consisting of vanadium oxide, vanadium nitride, and vanadium carbide.

(2) The heat-assisted magnetic recording medium according to (1), wherein in the second oxide layer, a total content of vanadium oxide, vanadium nitride, and vanadium carbide is within a range of 2 mol % to 40 mol %.

(3) The heat-assisted magnetic recording medium according to (1), wherein the second oxide layer has a thickness within a range of 0.2 nm to 2 nm.

(4) The heat-assisted magnetic recording medium according to (1), wherein the first oxide layer includes one or more compounds selected from the group consisting of tungsten oxide, niobium oxide, molybdenum oxide, tantalum oxide, tungsten nitride, niobium nitride, molybdenum nitride, tantalum nitride, tungsten carbide, molybdenum carbide, niobium carbide, and tantalum carbide, and wherein a total content of the one or more compounds in the first oxide layer is within a range of 1 mol % to 10 mol %.

(5) The heat-assisted magnetic recording medium according to (1), wherein the magnetic layer includes elemental nitrogen, elemental oxygen, or elemental carbon at grain boundaries of magnetic grains at an interface with the second oxide layer.

(6) A magnetic storage apparatus includes: the heat-assisted magnetic recording medium according to (1).

According to one aspect of the present invention, it is possible to provide a heat-assisted magnetic recording medium having excellent electromagnetic conversion characteristics.

DESCRIPTION OF THE PREFERRED EMBODIMENTS

Figure 1:
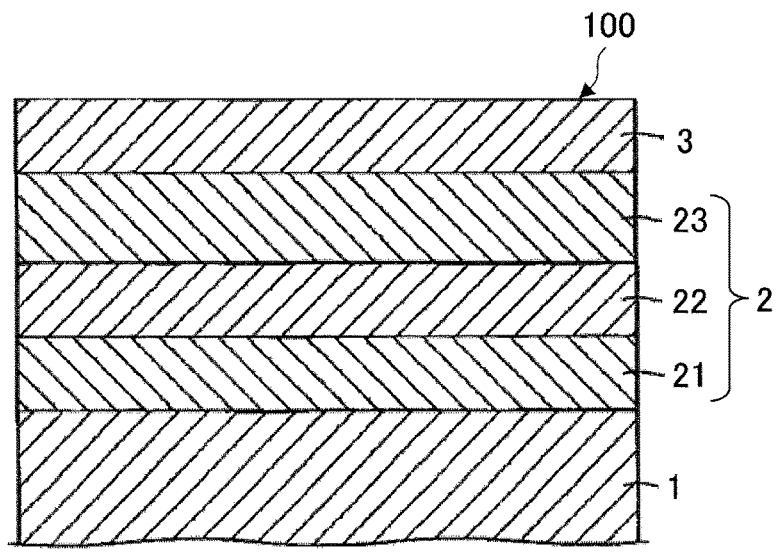
FIG. 1 is a schematic diagram illustrating an example of a layer structure of a heat-assisted magnetic recording medium according to an embodiment.

In the following, an embodiment of the present invention will be described with reference to the accompanying drawings. Note that in the drawings used in the following description, portions that are features may be enlarged in order to make the features easy to understand for convenience, and the dimensional ratios of respective components may not be the same as in the drawings.

(Heat-Assisted Magnetic Recording Medium)

FIG. 1 is a schematic diagram illustrating an example of a layer structure of a heat-assisted magnetic recording medium 100 according to an embodiment.

The heat-assisted magnetic recording medium 100 includes: a substrate 1; an underlayer 2; and a magnetic layer 3 including an alloy having an $L1_0$ structure. Here, the underlayer 2 includes, from the substrate 1 side, a bcc underlayer 21 including a substance having a bcc structure, a first oxide layer 22 that is in contact with the bcc underlayer 21, and a second oxide layer 23 that is in contact with the magnetic layer 3. The bcc underlayer 21, the first oxide layer 22, and the second oxide layer 23 are stacked in the recited order. Also, the first oxide layer 22 and the second oxide layer 23 include magnesium oxide (MgO). The second oxide layer 23 further includes one or more compounds selected from the group consisting of vanadium oxide ($V_2O_3$), vanadium nitride (VN), and vanadium carbide (VC) (hereinafter, referred to as one or more vanadium compounds).

By having the above described structure, in the heat-assisted magnetic recording medium 100, the (001) orientation of the magnetic layer 3 including an alloy having an $L1_0$ structure is enhanced. In addition, in the heat-assisted magnetic recording medium 100, the magnetic grains contained in the magnetic layer 3 are made finer and exchange coupling between the magnetic grains is reduced. As a result, the electromagnetic conversion characteristics of the heat-assisted magnetic recording medium 100 are enhanced.

Here, because the bcc underlayer 21 including a substance having a bcc structure is (100)-oriented, the first oxide layer 22 including magnesium oxide having a NaCl-type structure is caused to be (100)-oriented. Also, because the first oxide layer 22 is (100)-oriented, the second oxide layer 23 including magnesium oxide having a NaCl-type structure is caused to be (100)-oriented. As a result, the (100) plane of the second oxide layer 23 lattice-matches the (001) plane of the magnetic layer 3 including an alloy having an $L1_0$ structure, and the (001) orientation of the magnetic layer 3 is enhanced.

Conversely, magnesium oxide grains contained in the second oxide layer 23 are made finer by one or more vanadium compounds, which are contained in the second oxide layer 23.

Then, "One by one growth" is promoted in which one magnetic crystal grain constituting the magnetic layer 3 grows on one magnesium oxide crystal grain. As a result, the magnetic grains contained in the magnetic layer 3 can be made finer, separation between the magnetic grains can be prompted, and exchange coupling between the magnetic grains can be reduced.

Note that in a case where a metal-state vanadium is used instead of one or more vanadium compounds, at the time of being in contact with magnetic grains, at least a portion of the metal-state vanadium diffuses into the magnetic grains and the magnetism of the magnetic grains is decreased.

The content of magnesium oxide in the first oxide layer 22 is preferably 85 mol % or more, and is more preferably 90 mol % or more. When the content of magnesium oxide in the first oxide layer 22 is 90 mol % or more, the (100) orientation of the first oxide layer 22 is enhanced.

The content of magnesium oxide in the second oxide layer 23 is preferably 50 mol % or more, and is more preferably 70 mol % or more. When the content of magnesium oxide in the second oxide layer 23 is 60 mol % or more, the (100) orientation of the second oxide layer 23 is enhanced.

The total content of one or more vanadium compounds in the second oxide layer 23 is preferably in a range of 2 mol % to 40 mol %, and is more preferably in a range of 2.5 mol % to 15 mol %. When the total content of one or more vanadium compounds in the second oxide layer 23 is 2 mol % or more, magnesium oxide grains contained in the second oxide layer 23 can be further made finer. When the total content of one or more vanadium compounds in the second oxide layer 23 is 40 mol % or less, the (100) orientation of the second oxide layer 23 is further enhanced.

The thickness of the second oxide layer 23 is preferably in a range of 0.2 nm to 2 nm, and is more preferably in a range of 0.5 nm to 1.2 nm. When the thickness of the second oxide layer 23 is 0.2 nm or more, magnesium oxide grains contained in the second oxide layer 23 can be further made finer. When the thickness of the second oxide layer 23 is 2 nm or less, the heat dissipation property at the time of writing to the heat-assisted magnetic recording medium 100 is further enhanced.

It is preferable that the first oxide layer 22 includes one or more compounds selected from the group consisting of tungsten oxide ($WO_3$), niobium oxide ($Nb_2O_5$), molybdenum oxide ($MoO_3$), tantalum oxide ($Ta_2O_5$), tungsten nitride (WN), niobium nitride (NbN), molybdenum nitride (MoN), tantalum nitride (TaN), tungsten carbide (WC), molybdenum carbide (MoC), niobium carbide (NbC), and tantalum carbide (TaC). Accordingly, the adhesion of the first oxide layer 22 to the bcc underlayer 21 is enhanced, and magnesium oxide contained in the first oxide layer 22 easily heteroepitaxially grows on the substance having the bcc structure included in the bcc underlayer 21.

The total content of one or more compounds described above in the first oxide layer 22 is preferably in a range of 1 mol % to 10 mol %, and is more preferably in a range of 2 mol % to 5 mol %. When the total content of the above described compounds in the first oxide layer 22 is 1 mol % or more, the adhesion of the first oxide layer 22 to the bcc underlayer 21 can be further enhanced. When the total content of the above described compounds in the first oxide layer 22 is 10 mol % or less, the (100) orientation of the first oxide layer 22 can be further enhanced.

The substance having the bcc structure included in the bcc underlayer 21 is preferably Cr or a Cr alloy.

Examples of the Cr alloy include a Cr—Mn alloy, a Cr—Mo alloy, a Cr—W alloy, a Cr—V alloy, a Cr—Ti alloy, a Cr—Ru alloy, and the like, for example.

The content of the substance having the bcc structure in the bcc underlayer 21 is preferably 75 mol % or more, and is more preferably 90 mol % or more. When the content of the substance having the bcc structure in the bcc underlayer 21 is 90 mol % or more, the (100) orientation of the bcc underlayer 21 is enhanced.

An alloy having an $L1_0$ structure contained in the magnetic layer 3 is preferably a FePt magnetic alloy or a CoPt magnetic alloy.

The magnetic layer 3 preferably includes a grain boundary segregation material for magnetic grains. Thus, the magnetic layer 3 has a granular structure in which the magnetic grains having an $L1_0$ structure are divided by the grain boundary segregation material.

As the grain boundary segregation material for magnetic grains, an oxide such as silicon dioxide ($SiO_2$), titanium dioxide ($TiO_2$), chromium oxide ($Cr_2O_3$), aluminum oxide ($Al_2O_3$), tantalum oxide ($Ta_2O_5$), zirconium oxide ($ZrO_2$), yttrium oxide ($Y_2O_3$), cerium oxide ($CeO_2$), manganese oxide (MnO), titanium monoxide (TiO), or zinc oxide (ZnO), carbon (C), a carbide such as vanadium carbide (VC), a nitride such as vanadium nitride (VN), boron nitride (BN), titanium nitride (TiN), or the like may be used. Two or more of these may be used in combination as the grain boundary segregation material for magnetic grains.

The magnetic layer 3 preferably includes elemental nitrogen, elemental oxygen, or elemental carbon at grain boundaries of magnetic grains at the interface with the second oxide layer 23. Thus, the affinity between the grain boundaries at the interface between the magnetic layer 3 and the second oxide layer 23 becomes favorable, and the magnetic grains contained in the magnetic layer 3 easily grows heteroepitaxially on the magnesium oxide grains contained in the second oxide layer 23. As a result, "One by one growth" is prompted.

It is preferable that a protective layer is formed on the magnetic layer 3 in the heat-assisted magnetic recording medium 100.

A method of forming the protective layer is not limited to a particular method. For example, a RF-CVD (Radio Frequency-Chemical Vapor Deposition) method that decomposes a source gas made of hydrocarbon by high-frequency plasma, an IBD (Ion Beam Deposition) method that ionizes a source gas by electrons emitted from a filament, a FCVA (Filtered Cathodic Vacuum Arc) method that uses a solid carbon target without using a source gas, or the like may be used to form the protective layer.

The thickness of the protective layer is preferably 1 nm or more and 6 nm or less. The floating properties of the magnetic head become satisfactory when the thickness of the protective layer is 1 nm or more. Also, a magnetic spacing decreases and the SNR of the heat-assisted magnetic recording medium 100 is enhanced when the thickness of the protective layer is 6 nm or less.

In the heat-assisted magnetic recording medium 100, a lubricant layer including a perfluoropolyether-based lubricant may be further formed on the protective layer.

(Magnetic Storage Apparatus)

A magnetic storage apparatus according to the present embodiment is not limited to a particular structure, as long as the magnetic storage apparatus includes a heat-assisted magnetic recording medium according to the embodiment described above.

The magnetic storage apparatus according to the present embodiment includes, for example, a magnetic recording medium drive unit for rotating a heat-assisted magnetic recording medium, a magnetic head provided with a near field light generation element on its tip, a magnetic head drive unit for moving the magnetic head, and a recording and reproducing signal processing system.

Also, the magnetic head includes, for example, a laser light generation unit for heating the heat-assisted magnetic recording medium, and a waveguide for guiding laser light generated from the laser light generation unit to the near field light generation element.

Figure 2:
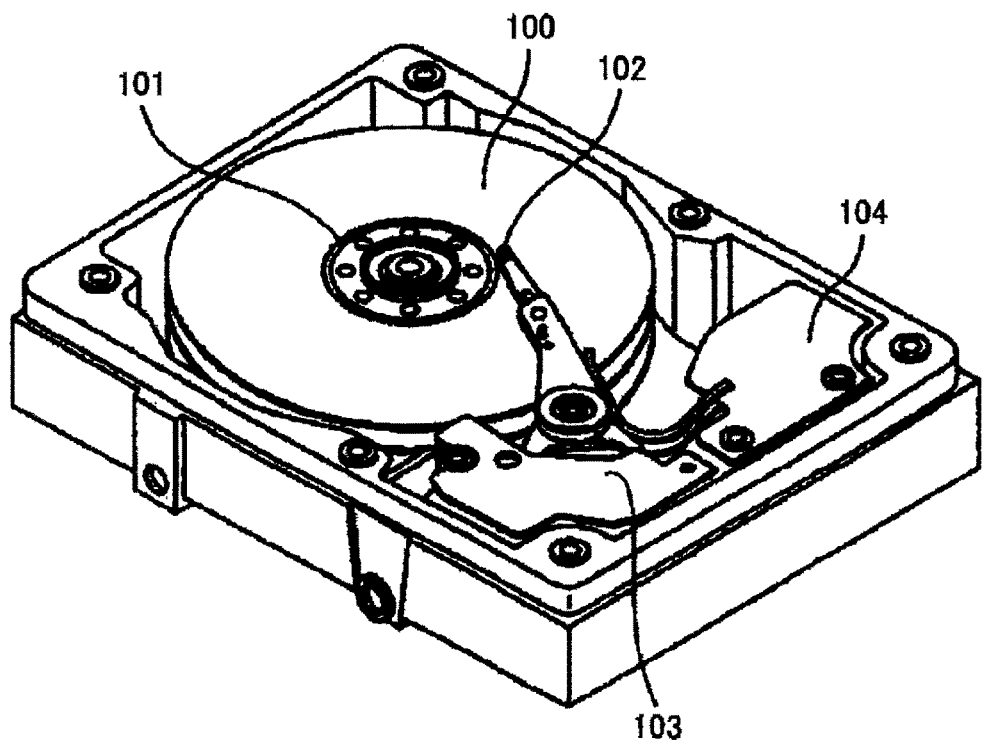
FIG. 2 is a schematic diagram illustrating an example of a magnetic storage apparatus according to the embodiment.

FIG. 2 illustrates an example of a magnetic storage apparatus according to the present embodiment.

The magnetic storage apparatus illustrated in FIG. 2 includes a heat-assisted magnetic recording medium 100, a magnetic recording medium drive unit 101 for rotating the heat-assisted magnetic recording medium 100, a magnetic head 102, a magnetic head drive unit 103 for moving the magnetic head 102, and a recording and reproducing signal processing system 104.

Figure 3:
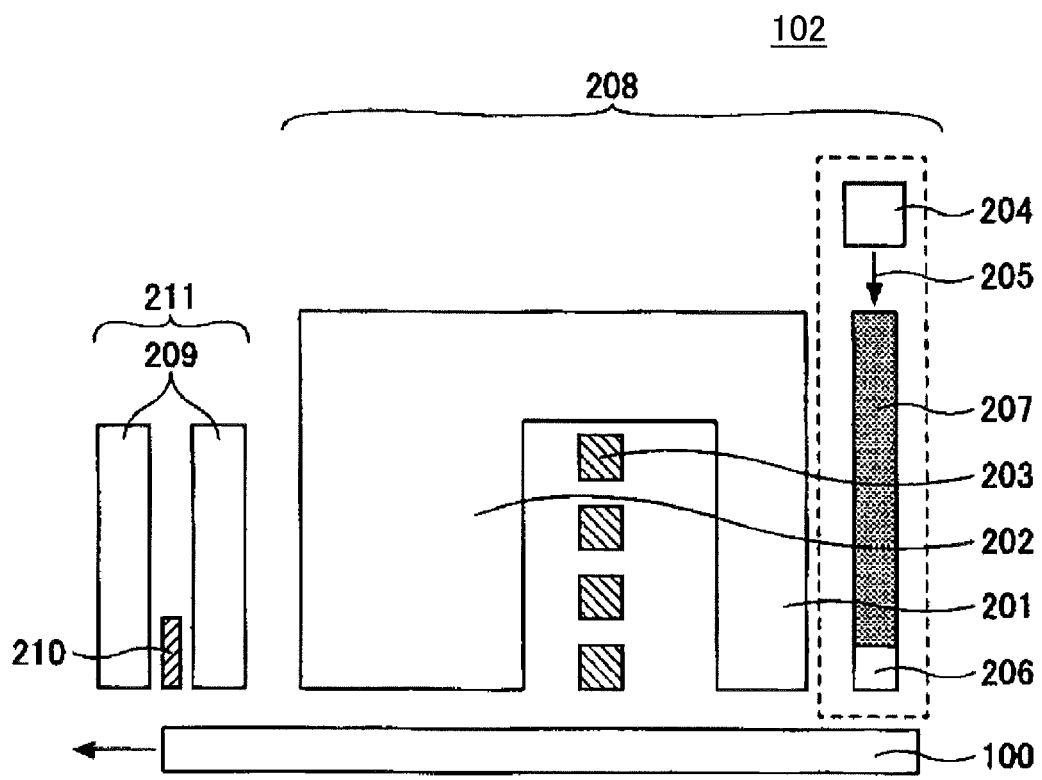
FIG. 3 is a schematic diagram illustrating an example of a magnetic head used in the magnetic storage apparatus of FIG. 2.

FIG. 3 illustrates an example of the magnetic head 102.

The magnetic head 102 includes a recording head 208 and a reproducing head 211.

The recording head 208 includes a main magnetic pole 201, an auxiliary magnetic pole 202, a coil 203 for generating a magnetic field, a laser diode (LD) 204, which serves as a laser light generation unit, and a waveguide 207 for transmitting laser light 205 generated at the LD 204 to a near field light generation element 206.

The reproducing head 211 includes a reproducing element 210 sandwiched by shields 209.

EXAMPLES

In the following, Examples of the present invention will be described. Note that the present invention is not limited to Examples described below, and various variations and modifications may be made without departing from the scope of the present invention.

Examples 1 to 30 and Comparative Examples 1 to 3

On a heat-resistant glass substrate, an alloy layer (underlayer) of Cr-50 at % Ti (in which the content of Cr is 50 at % and the content of Ti is 50 at %) having a thickness of 50 nm and an alloy layer (soft magnetic underlayer) of Co-20 at % Ta-5 at % B having a thickness of 25 nm were formed in this order and heated to 250° C. Thereafter, a Cr layer (bcc underlayer) having a thickness of 10 nm was formed. Thereafter, a first oxide layer and a second oxide layer were formed in this order and heated to 520° C. Thereafter, a magnetic layer having a thickness of 6 nm and a carbon layer (protective layer) having a thickness of 3 nm were formed. Note that in Comparative Examples 2 and 3, a first oxide layer and a second oxide layer were not formed, respectively. Finally, a perfluoropolyether-based lubricant was applied to the protective layer to form a lubricant layer to obtain a heat-assisted magnetic recording medium.

Here, the materials and the thicknesses constituting the first oxide layer and the second oxide layer, and the materials constituting the magnetic layers are indicated in Table 1.

For example, MgO-3 mol % $V_2O_3$ means that the content of MgO is 97 mol % and the content of $V_2O_3$ is 3 mol %.

(Electromagnetic Conversion Characteristics)

After incorporating a heat-assisted magnetic recording medium into a magnetic storage apparatus as illustrated in FIG. 2, the heat-assisted magnetic recording medium was heated using a magnetic head as illustrated in FIG. 3, a signal of liner recording density 1600 kFCI (kilo Flux changes per inch) was recorded, and the SN ratio (SNR) was measured. After writing a signal of 800 kFCI, a signal of 107 kFCI was overwritten, the remaining components of the signal of 800 kFCI were evaluated, and the overwriting characteristics (OW) were measured.

Table 1 indicates the measurement results of the electromagnetic conversion characteristics of the heat-assisted magnetic recording mediums.

TABLE 1

| | FIRST OXIDE LAYER | | SECOND OXIDE LAYER | |
| --- | --- | --- | --- | --- |
| | MATERIAL | THICKNESS [nm] | MATERIAL | THICKNESS [nm] |
| E1 | MgO | 1.0 | MgO—3 mol % $V_2O_3$ | 0.3 |
| E2 | MgO | 1.0 | MgO—3 mol % $V_2O_3$ | 0.9 |
| E3 | MgO | 1.0 | MgO—3 mol % $V_2O_3$ | 1.8 |
| E4 | MgO | 1.0 | MgO—10 mol % $V_2O_3$ | 0.3 |
| E5 | MgO | 1.0 | MgO—10 mol % $V_2O_3$ | 0.9 |
| E6 | MgO | 1.0 | MgO—10 mol % $V_2O_3$ | 1.8 |
| E7 | MgO | 1.0 | MgO—25 mol % $V_2O_3$ | 0.6 |
| E8 | MgO | 1.0 | MgO—40 mol % $V_2O_3$ | 0.6 |
| E9 | MgO | 1.0 | MgO—10 mol % VN | 0.6 |
| E10 | MgO | 1.0 | MgO—10 mol % VC | 0.6 |
| E11 | MgO | 1.0 | MgO—3 mol % $V_2O_3$ | 0.1 |
| E12 | MgO | 1.0 | MgO—50 mol % $V_2O_3$ | 0.6 |
| E13 | MgO | 1.0 | MgO—1 mol % $V_2O_3$ | 0.6 |
| E14 | MgO—2.5 mol % $WO_3$ | 1.0 | MgO—10 mol % $V_2O_3$ | 0.6 |
| E15 | MgO—4 mol % $MoO_3$ | 1.0 | MgO—10 mol % $V_2O_3$ | 0.6 |
| E16 | MgO—1.1 mol % $Nb_2O_5$ | 1.0 | MgO—10 mol % $V_2O_3$ | 0.6 |
| E17 | MgO—1.5 mol % $Ta_2O_5$ | 1.0 | MgO—10 mol % $V_2O_3$ | 0.6 |
| E18 | MgO—2.5 mol % WN | 1.0 | MgO—10 mol % $V_2O_3$ | 0.6 |
| E19 | MgO—4 mol % MoN | 1.0 | MgO—10 mol % $V_2O_3$ | 0.6 |
| E20 | MgO—1.1 mol % NbN | 1.0 | MgO—10 mol % $V_2O_3$ | 0.6 |
| E21 | MgO—1.5 mol % TaN | 1.0 | MgO—10 mol % $V_2O_3$ | 0.6 |
| E22 | MgO—2.8 mol % WC | 1.0 | MgO—10 mol % $V_2O_3$ | 0.6 |
| E23 | MgO—4.2 mol % MoC | 1.0 | MgO—10 mol % $V_2O_3$ | 0.6 |
| E24 | MgO—1.3 mol % NbC | 1.0 | MgO—10 mol % $V_2O_3$ | 0.6 |
| E25 | MgO—1.7 mol % TaC | 1.0 | MgO—10 mol % $V_2O_3$ | 0.6 |
| E26 | MgO—2.5 mol % $WO_3$ | 1.0 | MgO—10 mol % VN | 0.6 |
| E27 | MgO—4 mol % $MoO_3$ | 1.0 | MgO—10 mol % VN | 0.6 |
| E28 | MgO—2.5 mol % $WO_3$ | 1.0 | MgO—10 mol % VC | 0.6 |
| E29 | MgO | 1.0 | MgO—10 mol % $V_2O_3$ | 0.9 |
| E30 | MgO | 1.0 | MgO—10 mol % VN | 0.9 |
| CE1 | MgO | 1.0 | MgO—5 mol % $TiO_2$—5 mol % $Cr_2O_3$ | 1.2 |
| CE2 | — | — | MgO—25 mol % $V_2O_3$ | 1.6 |
| CE3 | MgO | 1.2 | — | — |
| CE4 | MgO | 1.0 | MgO—15 mol % V | 0.6 |

| | MAGNETIC LAYER MATERIAL | SNR [dB] | OW [dB] |
| --- | --- | --- | --- |
| E1 | (Fe—55 at % Pt)—40 mol % C | 15.3 | 35.9 |
| E2 | (Fe—55 at % Pt)—40 mol % C | 15.8 | 37.1 |
| E3 | (Fe—55 at % Pt)—40 mol % C | 15.1 | 35.4 |
| E4 | (Fe—55 at % Pt)—40 mol % C | 16.4 | 38.5 |
| E5 | (Fe—55 at % Pt)—40 mol % C | 16.6 | 39.0 |
| E6 | (Fe—55 at % Pt)—40 mol % C | 16.1 | 37.8 |
| E7 | (Fe—55 at % Pt)—40 mol % C | 15.1 | 35.4 |
| E8 | (Fe—55 at % Pt)—40 mol % C | 14.7 | 34.5 |
| E9 | (Fe—55 at % Pt)—40 mol % C | 17.1 | 40.1 |
| E10 | (Fe—55 at % Pt)—40 mol % C | 16.8 | 39.4 |
| E11 | (Fe—55 at % Pt)—40 mol % C | 14.3 | 35.9 |
| E12 | (Fe—55 at % Pt)—40 mol % C | 14.1 | 35.0 |
| E13 | (Fe—55 at % Pt)—40 mol % C | 14.1 | 34.9 |
| E14 | (Fe—55 at % Pt)—40 mol % C | 17.2 | 40.4 |
| E15 | (Fe—55 at % Pt)—40 mol % C | 17.0 | 39.9 |
| E16 | (Fe—55 at % Pt)—40 mol % C | 16.8 | 39.5 |
| E17 | (Fe—55 at % Pt)—40 mol % C | 16.9 | 40.0 |
| E18 | (Fe—55 at % Pt)—40 mol % C | 17.4 | 40.8 |
| E19 | (Fe—55 at % Pt)—40 mol % C | 17.2 | 40.4 |
| E20 | (Fe—55 at % Pt)—40 mol % C | 17.0 | 39.5 |
| E21 | (Fe—55 at % Pt)—40 mol % C | 17.1 | 40.0 |
| E22 | (Fe—55 at % Pt)—40 mol % C | 17.3 | 40.8 |
| E23 | (Fe—55 at % Pt)—40 mol % C | 17.1 | 40.3 |
| E24 | (Fe—55 at % Pt)—40 mol % C | 16.9 | 39.8 |
| E25 | (Fe—55 at % Pt)—40 mol % C | 16.9 | 40.1 |
| E26 | (Fe—55 at % Pt)—40 mol % C | 17.8 | 41.8 |
| E27 | (Fe—55 at % Pt)—40 mol % C | 17.6 | 41.3 |
| E28 | (Fe—55 at % Pt)—40 mol % C | 17.5 | 41.1 |
| E29 | (Fe—55 at % Pt)—27 mol % C—6.6 mol % $SiO_2$ | 17.1 | 40.8 |
| E30 | (Fe—55 at % Pt)—25 mol % C—14 mol % BN | 17.5 | 42.1 |
| CE1 | (Fe—55 at % Pt)—40 mol % C | 14.0 | 34.8 |
| CE2 | (Fe—55 at % Pt)—40 mol % C | 13.8 | 34.3 |
| CE3 | (Fe—55 at % Pt)—40 mol % C | 13.0 | 32.3 |
| CE4 | (Fe—55 at % Pt)—40 mol % C | 13.5 | 33.6 |

From Table 1, it is apparent that, in the heat-assisted magnetic recording mediums of Examples 1 to 30, the electromagnetic conversion characteristics are high.

With respect to the above, in each of the heat-assisted magnetic recording mediums of Comparative Examples 1 and 4, because the second oxide layer does not contain a vanadium compound, the electromagnetic conversion characteristics are low.

In the heat-assisted magnetic recording medium of Comparative Example 2, because a first oxide layer is not formed, the electromagnetic conversion characteristics are low.

In the heat-assisted magnetic recording medium of Comparative Example 3, because a second oxide layer is not formed, the electromagnetic conversion characteristics are low.

What is claimed is:

1. A heat-assisted magnetic recording medium comprising:
    a substrate;
    an underlayer; and
    a magnetic layer including an alloy having an $L1_0$ structure,
    wherein the underlayer includes, from the substrate side, a bcc underlayer including a substance having a bcc structure, a first oxide layer that is in contact with the bcc underlayer, and a second oxide layer that is in contact with the magnetic layer,
    wherein the bcc underlayer, the first oxide layer, and the second oxide layer are stacked in the recited order,
    wherein the first oxide layer and the second oxide layer include magnesium oxide, and
    wherein the second oxide layer further includes one or more compounds selected from the group consisting of vanadium oxide, vanadium nitride, and vanadium carbide.

2. The heat-assisted magnetic recording medium according to claim 1, wherein in the second oxide layer, a total content of vanadium oxide, vanadium nitride, and vanadium carbide is within a range of 2 mol % to 40 mol %.

3. The heat-assisted magnetic recording medium according to claim 1, wherein the second oxide layer has a thickness within a range of 0.2 nm to 2 nm.

4. The heat-assisted magnetic recording medium according to claim 1, wherein the first oxide layer includes one or more compounds selected from the group consisting of tungsten oxide, niobium oxide, molybdenum oxide, tantalum oxide, tungsten nitride, niobium nitride, molybdenum nitride, tantalum nitride, tungsten carbide, molybdenum carbide, niobium carbide, and tantalum carbide, and
    wherein a total content of the one or more compounds in the first oxide layer is within a range of 1 mol % to 10 mol %.

5. The heat-assisted magnetic recording medium according to claim 1, wherein the magnetic layer includes elemental nitrogen, elemental oxygen, or elemental carbon at grain boundaries of magnetic grains at an interface with the second oxide layer.

6. A magnetic storage apparatus comprising:
    the heat-assisted magnetic recording medium according to claim 1.

* * * * *